United States Patent [19]

Nelson

[11] Patent Number: 4,827,766

[45] Date of Patent: May 9, 1989

[54] DUAL FILTER, DROP BASED, DIGITAL RAINGAUGE

[76] Inventor: Joseph A. Nelson, 505 S. Webster St., Le Grand, Iowa 50142

[21] Appl. No.: 60,652

[22] Filed: Jun. 11, 1987

[51] Int. Cl.$^4$ ............................................... G01W 1/14
[52] U.S. Cl. ..................................... 73/171; 73/861.41
[58] Field of Search ............................ 73/171, 861.41; 340/602; 364/555

[56] References Cited

U.S. PATENT DOCUMENTS

| | | | |
|---|---|---|---|
| 3,721,122 | 3/1973 | Lucas | 73/171 |
| 4,105,028 | 8/1978 | Sadlier et al. | 73/861.41 X |
| 4,520,667 | 6/1985 | Nelson | 73/171 |

FOREIGN PATENT DOCUMENTS 591786  1/1978  U.S.S.R. ................................. 73/171

OTHER PUBLICATIONS

"A Rapid-Response Rain Gauge"; *J. Phys. E. Sci. Instrum.*, vol. 4, No. 8, pp. 601-602; Aug. 1971, J. R. Norbury et al.

*Primary Examiner*—Tom Noland

[57] ABSTRACT

A digital rain gauge which collects rainwater and then internally discharges the collected water in the form of individual droplets of equal volume. The discharge of each droplet is then detected and transmitted to a signal processor, which, in turn computes the amount of rainfall accumulated based upon the drop discharge rate and the determined drop volume.

15 Claims, 4 Drawing Sheets

DUAL FILTER, DROP BASED, DIGITAL RAINGAUGE

BACKGROUND OF THE INVENTION

This invention relates to an improved method and apparatus for the precise measurement of rainfall from low to heavy rainfall rates. In particular, it is an improvement over existing U.S. Pat. No. 4,520,667 by Nelson. Following are the specific details regarding the improved features over the prior art.

The raingauge under Pat. No. 4,520,667 is a drop based raingauge that utilizes the following distinct features;

1. One filter that serves only to filter the rainwater collected and which does not provide a pressure drop.
2. The collector cross sectional area is designed so that the maximum rate of rainwater collected does not exceed the maximum rate of drops being discharged. In other words the rate in equals the rate out.
3. A deflector and sloping water transfer means is required to minimize the rainwaters momentum and thus ensure drop volume uniformity.
4. The detection of a drop, via the probe matrix, is transmitted back to the receiving end by simply providing the resistance of the drop itself.

The main premise on which the aforementioned invention operates is that each drop being discharged is uniform in volume from low to heavy rainfall rates. Although this invention did provide an improvement over the prior art, there are limitations inherent to this approach, detailed as follows:

1. The resolution, or the number of drops detected per each one hundreth of an inch of rainfall received, is limited; to ensure that the drop discharge raate does not reach a point to where the volume of each drop does not begin to significantly increase and thus introduce an error.
2. The fact that the rate out equals the rate in means that as the rainfall rate itself varies, which many times does vary widely in relatively short time frames, the drop discharge rate will follow making methods of determining the drop volume, based upon the discharge rate, unstable and error prone.
3. The calibration process necessary to determine the actual nominal drop size, would require that the fixed volume of water being added to the collector be added at a slow fixed rate so as to not affect the drop size. This then requires additional apparatus to control the rate of water being added to the collector during this process.
4. The method of transmitting the detection of a drop to the receiving end by supplying the drop resistance means that the signal line used to carry this signal is a high impedance line, and thus is susceptible to electrical noise. Also, there is no means to eliminate the effects of the static electricity may have upon the drop detection means.

The present invention incorporates means to overcome the limitations as detailed above. The first item listed, which describes the limit on measurement resolution, is eliminated in the present invention by the use of the vent tube/reservoir combination. A collector cross sectional area could be chosen so as to allow the receipt of a significant volume of water, and thus a high number of drops per each one hundred of an inch, while at the same time implementing a reservoir to ensure that the water level existing within the collector and reservoir remain low enough so as to both maintain an acceptable drop discharge rate, and to avoid to overflow of the collector.

The second item listed as a limitation deals with the unpredictable fluctuations in the discharge rate if wide variations in the actual rainfall rate is encountered. Due to the filter pressure drops incorporated in the present invention, water is allowed to accumulate in the collector/reservoir area, which means that for the drop discharge rate to vary the water height in the collector must vary, which in turn is directly proportional to the water volume. Therefore, for the drop discharge rate to appreciably vary, a significant amount of rainfall must be received, which in turn produces a characteristic in the present invention where even though the discharge rate is allowed to vary over a predetermined range, this variance is "smooth" and predictable in its transistion.

The third item regarding the earlier patents limitations deals with the calibration process. In the present invention, due to its inherent characteristic of allowing water to accumulate in the collector/reservoir prior to being discharged, the calibration process is greatly simplified in that the fixed volume of water to be placed into the collector, that's necessary to perform the process, can be added instantaneouly, without the need for an additional external apparatus. This fact also lends the present invention to being easily calibrated by an automated "electronic calibration" approach.

The fourth item of the prior art as previously described deals with the means of transmitting the drop detection to the receiving signal processor. This approach renders the signal line that carries drop detectiion susceptible to electrical noise, due to the high impedance characteristics of the signal line, which may introduce errors to signal processor if the signal line is routed through an electrically noisy environment. The means of creating a current loop by using the drop resistance to directly turn a switching transistor on, in conjunction with a low value load resistor the receiving end of the signal transmission, produces a signal line characteristic that is low in impedance, and thus highly immune to electrical noise interference; such as would be expected during an electrical storm. Also, with the implementation of a means to discharge any static electricity that may have accumulated in the rain water, the integrity of the transmitted signal is further enhanced.

To summarize the specific improvements of the present invention over the prior art then would be; one, that the present invention allows a high degree of resolution with maintained accuracy; two, that the present invention allows variations in drop discharge rates, which are smooth and predictable in their transitions, and subsequently then that said variations can be used in computing both the actual drop volume as well as performing estimations of rainwater received but not yet discharged; three, that the present invention's design lends itself to being easily calibrated in electronic and automated fashion; and four, that the means of transmitting the drop detection to the signal processor, is more reliable in its electrical integrity, due to its immunity to both static electricity and electrical noise.

SUMMARY OF THE INVENTION

In general, the present invention incorporates a method and means to collect rainfall, measure it, automatically remove it from the collection means, and then to digitally indicate to the user the amount measured. Briefly stated, this process is accomplished as follows;

The rainwater is first collected, the volume of which is predetermined by the cross sectional area of the collectors opening, and then filtered by a filter located at the base of the collector. This filter serves to both purify the water collected and also to provide a pressure drop of the water collected. The water then directly enters the drop forming discharge funnel which is connected directly to the first filter at the base of the collector and leads to a second filter at the base of the funnel where the drop forming discharge orifice is located. Thus the discharge funnel is completely enclosed physically between the first filter and the second filter, except for a vent tube connected to the funnel between the two filters described.

The vent tube acts to both prevent at air lock from occurring between the two filters as well as to provide an optional reservoir for rainwater collected. The height of the vent tube in relation to the collector is designed in conjunction with the filter pressure drops so as to not overflow when the collector is full.

The purpose of the second filter located at the base of the discharge funnel is to provide a second pressure drop to the water collected so that the water passing through the filter has a low enough momentum to allow formation of drops at the discharge orifice that are nearly uniform in volume.

The constant forces at work upon the drop, as it is being formed, are the forces of gravity pulling the water downward, the discharge orifice which opposes the force of gravity, and the surface tension characteristics of water which causes the apparent adhesion of the water to itself. The force which is variable during drop formation is that created by the momentum of the water through the second filter. Due to the pressure drop of the second filter this momentum is low, though it does slightly affect the volume of each drop. Therefore, the volume of each drop being discharged is proportional to the rate of drops being discharged.

The drops that have discharged are detected by using their resistance to turn on a transistor, which in turn causes a current loop back to the receiving end. The signal received is processed by an instrument that has computing capability, such as a microprocessor, a computer, or discreet digital electronics. This instrument then monitors both the total count of drops detected as well as the time between drops. This information is used to determine the actual amount of rainfall received; based upon both the amount already discharged, and the amount estimated to be in the collector and vent reservoir waiting to be discharged. The final computation is then displayed to the operator in digital form.

The drops that have discharged are then completely removed from the collector housing so as to complete the automation of the rainfall measurement.

BRIEF DESCRIPTION OF DRAWINGS

Other objects, features and advantages of the invention will be apparent from the following detailed description when read with the accompanying drawing which shows the presently preferred embodiment of the invention.

In the drawings.

DESCRIPTION OF THE PREFERRED EMBODIMENT

Figure 1:
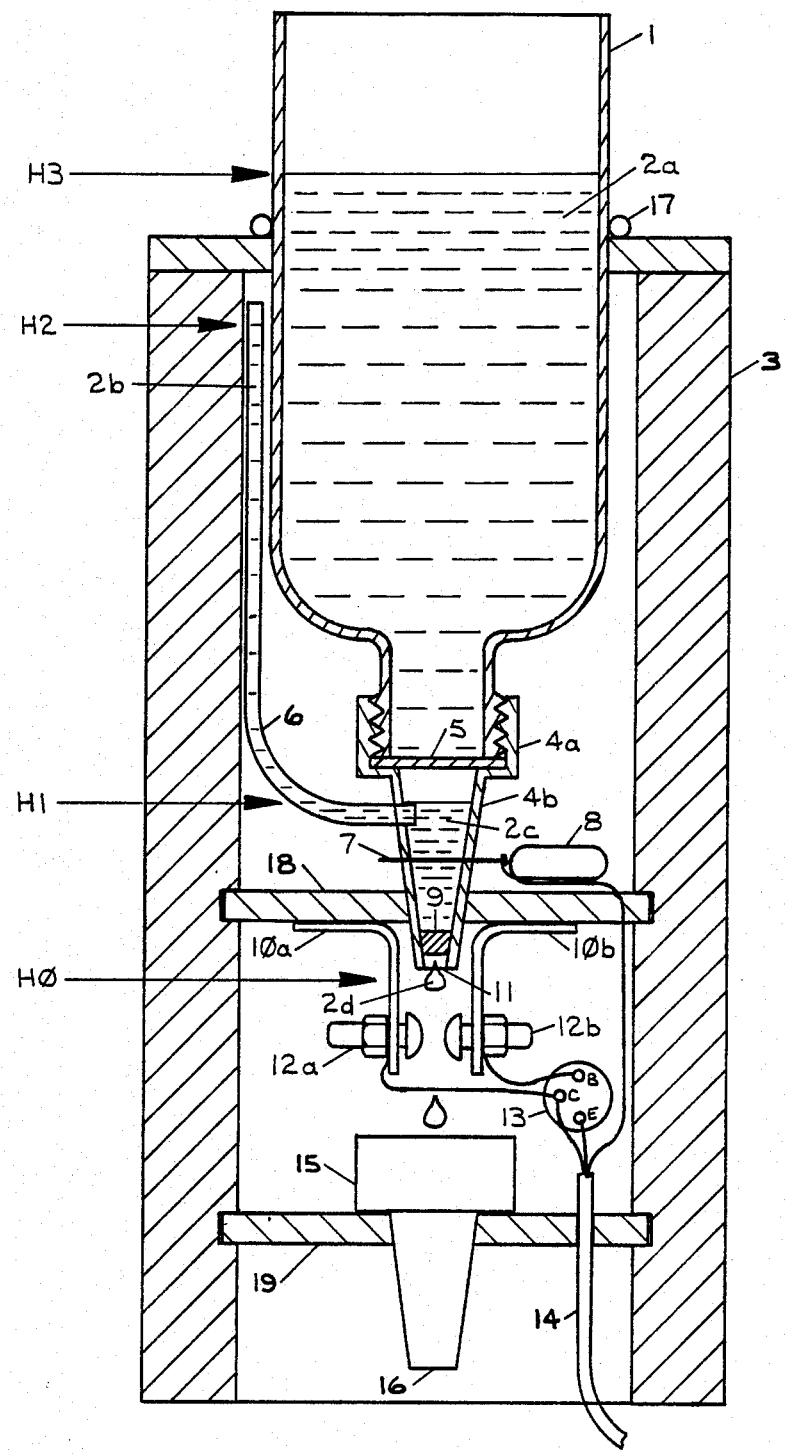
FIG. 1 Shows a cross sectional two dimensional view of the rain water collector, drop formation means, and drop detector, along with the associated housing.

Referring to the drawings, and more particularly to FIG. 1, the raingauge of the present invention is described in detail as follows;

The rainwater 2a is first collected using collector 1, which is cylindrical in shape and incorporates an opening with a predetermined cross sectional area so as to allow the reception of the required volume of water per a given rainfall amount. This collector 1 is mounted into the collector housing 3, and utilizes an o-ring 17 at the joint of the collector 1 and housing 3 to ensure that rainwater does not leak into the housing 3 area. The rainwater collected is then directed toward filter 5 which is located at the base of the threaded cap 4a. The threaded joint between cap 4a and base of collector 1 is sealed so as to not allow the collected water to escape through the threads. Once the water has absorbed into filter 5, it will begin flow into funnel 4b and travel along the internal sides of said funnel 4b to filter 9. It is after the second filter where the water 2c will begin to form a droplet at the orifice 11 of funnel 4b, and then discharge in droplet form 2d, in nearly equal volumes.

The first filter 5, which is typically a paper filter that is 1 inch in diameter and approximately 2 mils thick, is used to remove impurities from the rainfall, and to create a pressure drop that is proportional to the pressure drop created by the second filter 9. In regard to the filtering aspect of filter 5, it incorporates a cross sectional area that is larger then that of filter 9 so that any impurities collected thereby would be equally distributed across this area and thus take longer to render the filter 5 useless—where the water will no longer flow through the filter 5.

The second filter is not used to further filter the water, but rather is intended to provide a pressure drop only. It is typically comprised of cotton that is $\frac{1}{8}$ inch in diameter, $\frac{1}{8}$ inch deep, and compacted with approximately 8 ounces of pressure to create a consitency that provides the desired pressure drop.

The pressure drops described as occurring on both filter 5 and filter 9 are required for two purposes described as follows;

(1.) The total resistive qualities of both filters, acting against the flow of water through the collector/funnel combination that causes the pressure drops, is required to create the desired drop rate for a given height of water residing in the collector 1 and vent tube 6. For example, if the water accumulated in collector 1 reaches the level H3 as indicated in FIG. 1, and the drop rate desired at that level is 2 drops per second, then the total pressure drop across both filters could be determined.

(2.) The second purpose of the pressure drops is to create a pressure drop ratio between filter 5 and filter 9 so that the level of water 2b in the vent tube 6 is lower then the level of water 2a in the collector 1 by an amount that prevents the internal overflow of water from the vent tube 6 (the collector 1 should overflow before the vent tube 6).

The total pressure drops are calculated based upon the water levels H3, H2, and H1, and the rate of water being transferred at point H0, all shown in FIG. 1. Note that point H0, located at filter 9, is where the water height is considered to be zero and is used as the reference for the water heights of points H1 to H3. Assuming that the water levels and flow rate are given, then the pressure drops can be calculated as follows;

THE EQUATION TO CALCULATE PRESSURE BASED ON WATER HEIGHT IS
$P = pgh$; where the variables are defined as follows;
  P = pressure in pounds per cubic foot.
  h = heigth of water above point P in inches.
  quantity pg = the "weight density" of a fluid, which for water is 62.4 lbs/cubic ft., or 0.578 ounces/cubic inch.

Assume that the water levels shown in FIG. 1, namely points H1 or H3, are in inches and referenced to H0, and that their values are as follows;

| | |
|---|---|
| H1 = 0.8 inches | Level at lower end of vent tube 6. |
| H2 = 4.0 inches | Level at upper end of vent tube 6. |
| H3 = 5.0 inches | Top surface of water in collector. |

Pressure at point H1 = (0.578)(4 − 0.8) = 1.85 OZ./SQ. IN. Pressure at same point if filter was not present would be:

$$(0.578)(5 - 0.8) = 2.43 \text{ OZ./SQ. IN.}$$

PRESSURE DROP ACROSS FILTER 5: 2.43 − 1.85 = 0.58 ounces per sq. in.

Assuming that the amount of water being discharged out the funnel 4b is 2 drops per second at the given water levels, and that the volume of each drop is 0.005 cubic inches, and also that the orifice 11 diameter is 3/32 inch, then the water pressure at point H0 can be determined by using the water height that would cause the water velocity at point H0 under free fall conditions;

VELOCITY @ H0 = VOLUME TRANSFER PER SEC/AREA OF ORIFICE = [(2)(0.005)]/[(PI)(3/64)(3/64)] = 1.45 IN/SEC.

THE STANDARD GRAVITY EQUATIONS FOR COMPUTING VELOCITY AND DISTANCE ON A FREE FALLING BODY IS SHOWN AS FOLLOWS;

$$V = Gt \text{ and } D = \tfrac{1}{2} G (t \text{ SQUARED});$$

WHERE G = 32 ft/sec, V = VELOCITY, D = DISTANCE, t = TIME
IF V IS GIVEN TO BE 1.45 THEN D = ½ (V SQUARED)/G = 0.0027 INCHES.
THEREFORE PRESSURE AT POINT H0 = (0.578)(0.0027) = 0.0016 OZ per sq in.
WITHOUT FILTER 9 THE PRESSURE WOULD BE (0.578)(4) = 2.31 OZ per sq in. THEREFORE THE PRESSURE DROP = 2.31 − 0.0016 = 2.3084 OZ per sq in.

To achieve the above results then, the filters 5 and 9 must be chosen so tht the total pressure drop presented is 2.3084 + 0.58, or 2.8884 ounces per square inch, and that the pressure ratio between filter 5 and filter 9 is;

PRESSURE DROP RATIO = 0.58/2.2.304, OR APPROXIMATELY 1:4.

Note thaat with this ratio, and with the present invention as shown in FIG. 1, that the difference in distance between level H3 and H2 is greater than the distance between the top of the collector 1 and the top of the vent tube 6. This will ensure that the collector 1 will overflow before the vent tube 6.

The vent tube 6 is typically comprised of a flexible plastic tube that has an internal diameter of approximately ⅛ inch. The vent tube 6 will always lead upward toward the top of the collector housing 3 and will be open ended to the air resident within said housing 3.

Figure 3:
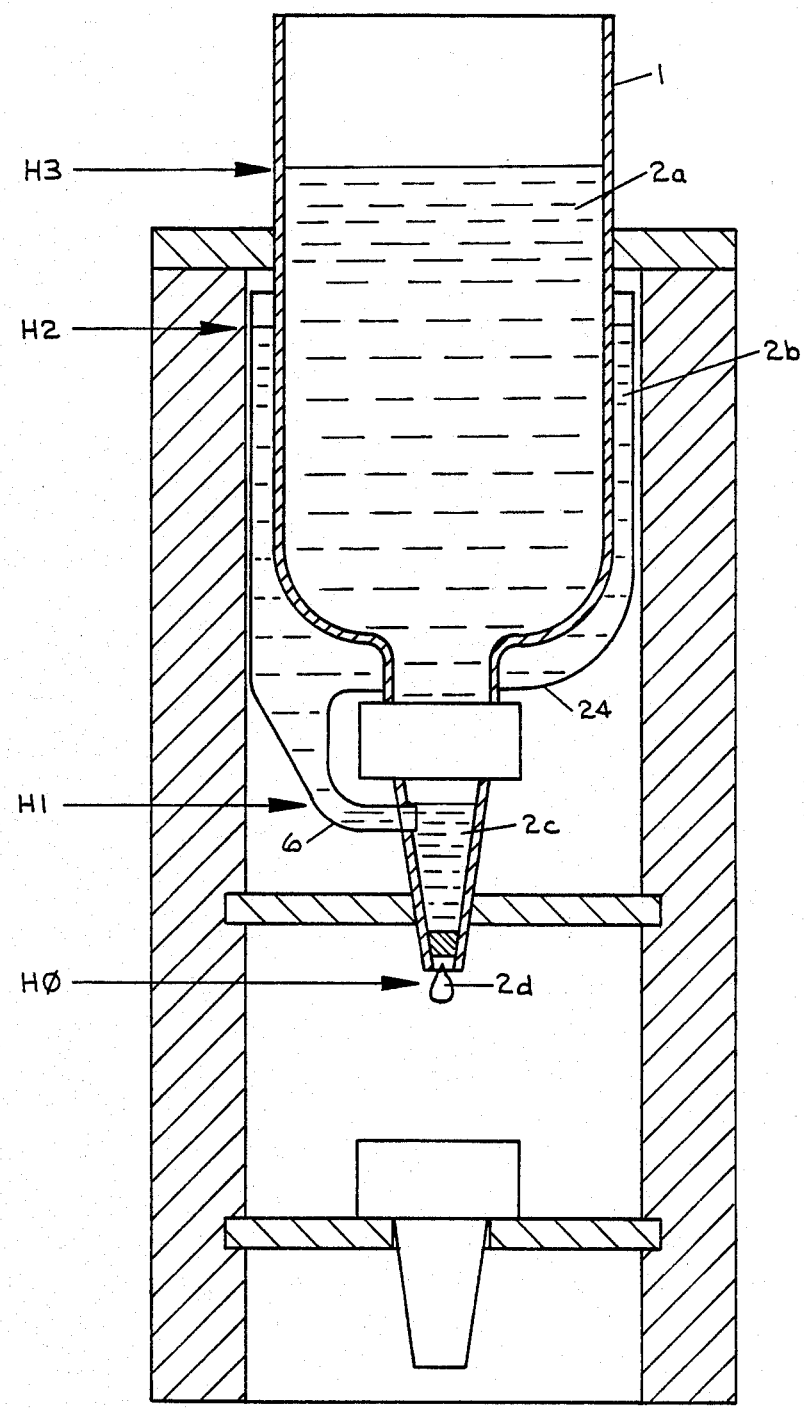
FIG. 3 Shows the basic collector with the optional reservoir connected to the vent tube.

Once water has been absorbed into both filters, and the column of water in the funnel 4b has not risen high enough to cause the formation of a droplet at the orifice 11, then the air that is trapped between the two filters prevents additional water from flowing into the funnel 4b area. The need for the vent tube 6 is to prevent an air lock from forming between the two filters, so that water can flow into the funnel 4b regardless of the water column present. In addition, the vent tube 6 can actually lead to a reservoir 24 within the collector housing 3, as shown in FIG. 3; this allows for a greater volume of water to be collected in a shorter period of time before the collector 1 overflows. According to FIG. 3, the reservoir 24 shown is cylindrical in shape and encloses the collector 1—however, any particular shape and size would due. Note that the water level within the discharge funnel 4b will not rise above the top of the vent tube 6 due to the trapped air above this point; however, as previously described, this will not prevent this water level from lowering as drops are discharged, as air can replace the water through the vent tube 6.

Once a drop 2d has been formed at the discharge orifice 11, and has gained sufficient mass to release in free fall, it will simultaneously make contact with probes 12a and 12b a short time later. These probes are comprised of stainless steel contacts which are installed at a fixed distance from the discharge orifice 11 and located directly beneath said orifice 11. This distance, as well as the spacing between the probe surfaces, is designed to be close enough to minimize alignment effects; to where the drop may not contact both probes if the collector housing 3 is significantly misaligned, and far enough away to build up enough momentum to avoid accidental water bridging when misaligned. Also, the probes themselves utilize rounded ends where contact is made with the droplets, so that if there is a slight misalignment in the collector housing 3, to where the drop may make contact with only one probe initially, it will be deflected by the probe shape toward the other probe to ensure a simultaneous contact with both probes.

Each contact probe is mounted onto an L bracket for support; probe 12a is mounted onto bracket 10a, and probe 12b is mounted onto bracket 10b. The brackets themselves are mounted to the bottom the collector support means 18 and is used to create the proper distance below the discharge orifice 11 and the proper spacing between each probe. The collector support 18 is designed with a hole in its center for the positioning of the discharge funnel 4b; the diameter of said hole is specified based upon the outside diameter of the funnel 4b in conjunction with its slope so as to provide a fixed spacing between the discharge orifice 11 and the probe detector 12 when the discharge funnel 4b and collector 1 combination are mounted firmly in place.

Figure 2:
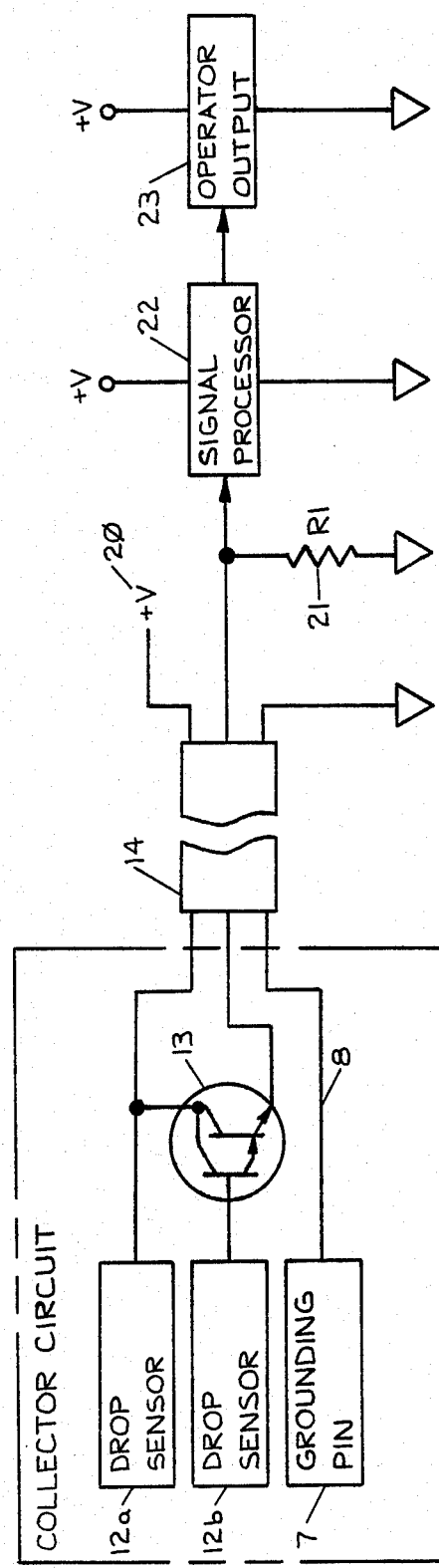
FIG. 2 Shows the schematic of both the drop detector circuit residing in the collector housing and the receiving circuitry, as well as a block diagram showing the processing of the signal received and subsequent output.

The probe contacts 12 are connected to transistor 13 and individual wires of cable 16, as shown in FIG. 2. The typical resistance of a drop as detected by the given probes 12a and 12b is approximately 500K ohms. The transistor 13 shown in FIG. 2 in the present invention is a bipolar darlington pair transistor with a minimum gain of 5,000. When a drop of water makes contact with the probes, it acts to bias transistor 13 ON so as to create a current loop to the receiving end via cable 14. When this current is present it will create a voltage drop on the load resistor 21, also designated R1, at the receiving end, so that the signal processor 22 will register a logical "1". Likewise, when the current is not present, the voltage drop is zero so that the signal processor 22 will register a logical "0".

Given that the minimum voltage required across the load resistor 21 to be recognized as a logical "1" is 2.0 volts, and that the desired current is a minimum of 2 milliamps in the ON state, then the resistive of load resistor 21 can be calculated by using the following three equations;

```
EQ-1    R = 2.0 / 0.002              R = 1.2K ohms.
EQ-2    E = 2.0 + 1.2 + Vr           E = 3.7
EQ-3    0.005 = [(Vr)/(500K)](5,000) Vr = 0.5
WHERE E = TRANSISTOR VOLTAGE +V SHOWN AS
          ITEM 20 ON FIG. 2.
      Vr = VOLTAGE DROP ACROSS PROBES WITH
           DROP PRESENT.
      1.2 = BASE EMITTER VOLTAGE DROP ON
            TRANSISTOR.
      R = RESISTANCE OF LOAD RESISTOR 21.
```

If the transistor 13 supply voltage 20 is the same as the signal processor 22 voltage, which
typically would be 5.0 volts, and that the value of the current loop is maintained at 2 milliamps,
then the voltage drop across the load
resistor 21 and corresponding current during the ON state would be as follows;

```
VOLTAGE DROP = 3.5 volts      (meets requirements)
CURRENT LOOP = 3 milliamps    (meets requirements)
```

The resistance of 1.2K ohms used as the load resistor 21 not only provides the appropriate voltage drop, but also provides a low impedance as "seen" by the collector circuit to help ensure noise immunity. Also, cable 14 uses the signal ground as a shield to further ensure noise immunity.

The ground wire 8 is connected to a grounding pin 7 which is connected to the funnel/cap 4 in such a way as to make contact with the water collected prior to being discharged. In the present invention, pin 7 is a stainless steel pin that is inserted through the plastic funnel 4b, and the ground wire 8 is of a length to allow for the removal of the collector 1 from the top of the collector housing 3, without removing the ground pin 7, to allow for filter 5 maintenance.

The purpose of the ground pin 7 is to ensure that any static electricity present in the rainwater is discharged to ground prior to being released to the contact probes. This is to ensure that any static voltage potential does not cause faulty readings at the receiving end where signal processing takes place. This static electricity is generated by the raindrops falling through the air as well as the wind blowing across the collector 1.

The drops that are being discharged from the orifice 11 are equal in volume at the lower discharge rates. However, once the discharge rate rises above 1.2 drops per second, the volume of each drop begins to increase exponentially. The following equation predicts the amount of increase in each drop;

$$Y = (A)(X \text{ TO THE POWER OF } B); \text{ Where } A = 0.0226, B = 2.47789.$$

Figure 4:
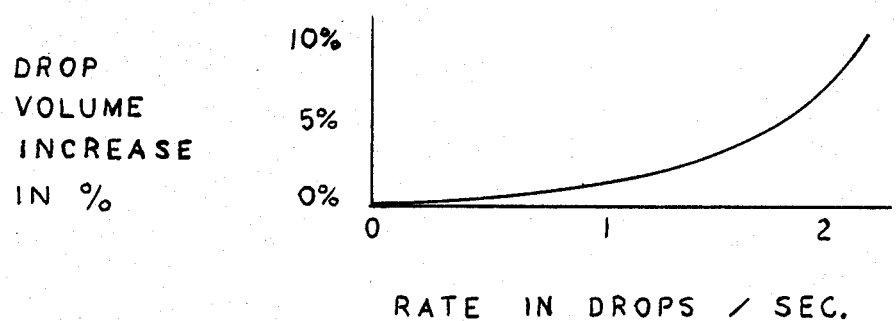
FIG. 4 is a graphical representation of the relationship between the percentage of drop volume increase versus the drop discharge rate.

A resultant graph representing the above equation is illustrated in FIG. 4.

At this point it can be seen that if the drop rate is expected to rise above a level to where the drop volume increase begins to introduce a significant error, then a method of compensation would be required; such as using the equation above to determine the actual drop-size based upon rate when computing the amount of rainwater received.

Two features are to be considered when designing the rain gauge; the desired maximum drop rate desired under the maximum desired rainfall level in the collector 1, and the amount of drop resolution desired, i.e. the quantity of drops per a given amount of rainfall. The factors that are variable to obtain these features are the cross sectional area of the collector 1, and the filter pressure drops. Note that the size of the orifice 11 opening is to remain constant at an optimal 3/16 inches in diameter. With this orifice size, the typical drop being discharged, at low discharge rates, is approximately 0.004 cubic inches.

Before determining what these factors should be, it must first be understood how the actual rainfall amount is computed. As described earlier, each drop that is detected by the probes 12a and 12b transmits a signal to the signal processor 22. Upon receipt of this signal the processor 22 computes the rainfall amount received by dividing the drop volume by the area of the collector 1 cross sectional area, shown as follows;

RAINFALL = ACCUMULATED RAINFALL + DROP VOLUME/COLLECTOR AREA.

However, if the drop discharge rates are expected to be high enough so as to significantly vary the drop volumes, then the actual drop should be computed based upon the drop rate using the following equation;

VOLUME = (NOMINAL VOLUME) [1 + (A) (RATE TO THE POWER OF B)]

Where $A = 0.0226$, $B = 2.4778$, and nominal volume equals the drop volume at the lower rates; where the increases in drop volume is negligible.

If the drop resolution desired is 10 drops per each one hundreth of an inch received, then the average internal cross sectional area of collector can be computed as follows;

SOLVING FOR R (average 0.004 = (0.01) (pi) (R squared)/10; COLLECTOR RADIUS) IN THIS CASE YIELDS: 1.128 IN.

Also, if the drop discharge rate is desired to be 2 drops per second, with the max water level desired to be 5.0 inches, then the filter pressure drops can be computed as follows;

VELOCITY AT POINT H0 = VOLUME TRANSFER PER SEC/AREA OF ORIFICE

DROP VOLUME = NOMINAL DROP PLUS INCREASE BASED UPON RATE: VOLUME = (0.004)[1+(A) (RATE TO THE POWER OR B)] = 0.0045 cubic in.

VELOCITY = (2 DROPS) (DROP VOLUME)/([(PI)(3/64) (3/64)] = 1.304 INCHES PER SECOND.

PRESSURE AT POINT H0 = (0.578) [($\frac{1}{2}$) (1.304 SQUARED)/G] = 0.0013 OUNCES PER SQUARE INCH.

WITHOUT EITHER FILTER THE PRESSURE AT POINT H0; PRESSURE = (0.578) (5) = 2.89 OUNCES PER SQUARE INCH. Considering that the pressure at point H0 was negligible, then THE TOTAL PRESSURE DROP DESIRED = 2.89 OUNCES per sq. inch. WITH THE DESIRED PRESSURE DROP RATIO OF 1:4 EACH FILTER CAN BE CHOSEN SO THAT THE PRESSURE DROP ON FILTER 5 = $\frac{1}{4}$ of 2.89, OR 0.7225, AND THAT THE PRESSURE DROP ON FILTER 9 = $\frac{3}{4}$ OF 2.17, OR 0.7225, both of these last mentioned pressure drops being in dimensions of ounces per square inch.

Note that with the present invention, a high degree of accuracy can be obtained, as well as a high degree of resolution. This means that the digital readings can be accurate to within two thousandth of an inch regardless of the rainfall rate—provided that the drop discharge rate does not exceed 2 drops per second. However, the apparent tradeoff with this approach is the slow response time the device requires to total the collected water. If, for example, the collector 1 diameter is 2.25 inches, and the accumulated water level in the collector 1 is 5.0 inches, and that the average drop volume is 0.0043 cubic inches with an average discharge rate of 0.8 drops per second, then the time required to totally discharge said water, and thus compute the rainfall amount received, would be approximately 1.28 hours.

To solve the problem of this low response time, either the resolution desired (e.g., 10 drops/sec) could be lowered, or, compensation could be achieved by using the timing and computing power of the signal processor 22 to estimate the amount of water residing in the collector 1, and optional reservoir 24, based upon the given drop rate. This is possible due to the fact that the drop discharge rate is proportional to the water pressure, or water height, which when once determined can be used to compute the water volume present, and thus the rainfall received but not yet discharged.

Figure 5:
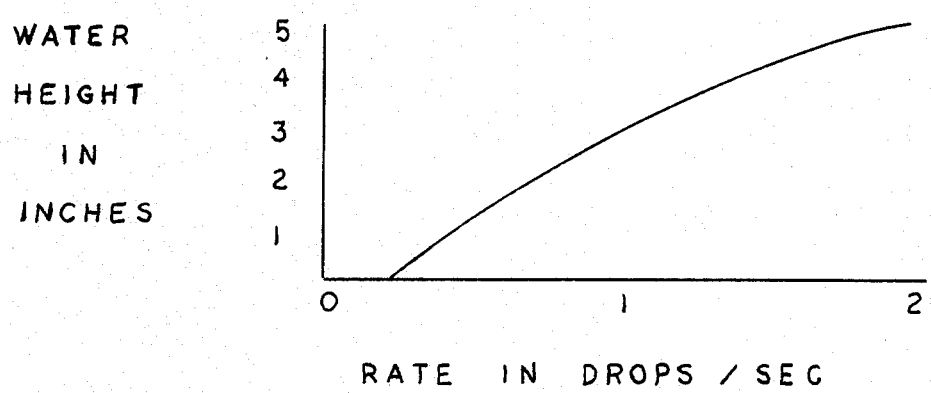
FIG. 5 is a graphical representation of the relationship between the height of the rainwater within the collector versus the drop discharge rate.

The relationship between the water height and discharge rate is shown graphically by FIG. 5 which is based upon the following equation:

HEIGHT = (A)(RATE SQUARED) + (B)(RATE) + C

WHERE A = −0.8955, B = 4.3693, C = −0.028

If the drop discharge rate is known, then rainfall amount received, but not yet discharged, can be estimated. This is accomplished by first determining the height of water residing in the collector 1 by using the equation described above. This then can be used to determine the volume of water resident in the collector 1; the rainfall amount present would then be computed by dividing the volume determined by the average cross sectional area of the collector 1. If the signal processor 22 is computer based, then the volume determination could be in the form of a lookup table in software, such as a variable array where the subscript passed within the array would be the height and the returned result would be the volume present. This lookup table would contain the volume resident within the collector 1 for a given height, as previously determined, based upon the particular spatial characteristics of the given collector 1 design.

The signal processor 22 itself could be a computer, as previously stated, or a microprocessor or microcontroller based system, or could be based upon digital discreet electronics. The operator output 23 could be a computer monitor or computer driven television screen which would indicated the rainfall amount, most likely in digital form.

When using the above method to offset the slow response time by utilizing an estimate, then the equation used to determine what the present rainfall amount is used in conjunction with the estimate described to indicate to the operator the rainfall amount measured, detailed as follows;

RAIN = ACCUMULATED RAIN + DROP VOLUME/COLLECTOR AREA (this equation is performed after each drop is detected).

DIGITAL DISPLAY = RAIN + ESTIMATE.

Note that as the collector 1 begins to empty that the estimate portion of the equation approaches zero, and that the final reading is based upon actual drops detected; thus the final reading is highly accurate without any estimation involved.

Due to the fact that the pressure drops that occur across the filters, and that the nominal drop size at lower discharge rates may vary with time, that a means must be provided to accommodate this possibility. This potential problem is remedied by performing an electronic calibration on a periodic basis. This process involves, first, placing the signal processor 22 in a "calibration mode", which prepared the instrument for the data to be gathered, and then to place a fixed volume of water into the collector 1. This volume would typically be equivalent to the volume of one inch of rainfall received for the given collector 1 size used. This volume of water would yield both a known height in the collector 1, as well as a drop rate that would be low enough so as to render any variations in the drop volumes, based upon the given discharge rate, negligible. The volume of each drop of water being discharged can then easily be computed by dividing the known fixed volume by the final quantity of drops detected. Also, the initial rate of drop discharge can also be measured for the given known water height. This information can be used to "modify" the method in determining the water estimation by first scaling the given rate with the CAL FACTOR before using equation to perform the estimation. The CAL FACTOR is determined through the calibration process shown as follows;

CAL FACTOR = ACTUAL HEIGHT/PREDICTED HEIGHT BASED ON RATE K = (CAL FACTOR) (ACTUAL RATE).

HEIGHT = (A)(SQUARED) + (B)(K) + C

WHERE A = −0.8955, B = 4.3693, C = −0.028

Once the drops have been detected and have passed beyond the detection probes, they will enter the drop removal collector 15 and then be discharged outside the collector housing 3 via the removal funnel and orifice 16. The removal collector is mounted on a support means 19 and is located directly below the detection probes. This then completes the cycle of collection, detection, and removal which makes this system fully automatic.

What is claimed is:

1. A gauge for measuring low to heavy rainfall rates comprising: rainwater collection means with a height and cross sectional area predetermined to provide a desired resolution for rainwater collection, which channels the rainwater to a filter at a lower end thereof, a means for filtering the collected rainwater and to reduce the pressure created by any water resident within the collector by a predetermined amount, and which is directly connected to a discharge funnel apparatus which receives at an upper end thereof the rainwater from a filter at the base of the collector and transfers it to a filter means located near the bottom of said funnel, a means to vent air to the funnel that connects to the two aforementioned filters and which is arranged so that rainwater will overflow the collector before rainwater will exit through the vent, the filter means located near the base of the discharge funnel providing a predetermined drop in the water pressure, a discharge orifice located at the base of the discharge funnel designed to allow the collected water to discharge in the form of droplets, a means to detect the discharge of a drop from the discharge orifice based upon the resistance of the water combined with a means for substantially preventing any static electricity in the collected rainwater from affecting the detection of the discharge drop, and a means to transmit the detection of said discharged drop via a current loop to a signal processor to process the drop detection signal received so as to provide an output to an operator indicating the amount of rainwater received.

2. A gauge according to claim 1 in which the filters comprise a pair of filters selected so that the total drop in water pressure across both of them yields a specific drop discharge rate when a given height of water is resident within the collector means.

3. A gauge according to claim 1 in which the filters comprise a pair of filters selected so the drop in water pressure across them both is in a predetermined ratio in accord with the arrangement that rainwater will overflow the collector before rain water will exit through the vent.

4. A gauge according to claim 1 in which the vent means comprises a vent tube connected in a sealed fashion directly into a side of the discharge funnel and leading upward to a point near a top of a housing for the collector where it is open ended to air resident within the collector housing.

5. A gauge according to claim 1 in which the means for reducing the effects of static electricity discharges static electricity from the collected rainwater to a low voltage potential prior to the water being discharged in the form of a droplet, by means of placing said rainwater into electrical contact with the low voltage potential prior to said discharge.

6. A gauge according to claim 5, in which the means of placing said rainwater into electrical contact with the low voltage potential prior to said discharge comprises a stainless steel pin placed into the discharge funnel, which pin is electrically connected to circuit ground potential.

7. A gauge according to claim 1, in which the means which performs the drop detection comprises two stainless steel rounded tip probes located directly beneath the discharge orifice, and which probes are designed to make electrical contact with the drop being discharged, and thus measure the resistance of said drop, with a distance of the probes below said discharge orifice small enough that the probes are easily aligned therewith but far enough away that a drop will not remain in contact with both probes and fail to fully exit due to a lack of momentum gained in the distance it has fallen free of the nozzle, and wherein the probe tips, which are the parts of the probe that directly contact the drop, are sufficiently close so that if the probe tips are slightly misaligned with respect to a vertical line through the center of the discharge orifice and the drop initially contacts only one tip it will be deflected into contact with the other tip so that an electrical connection between the probes can still be completed.

8. A gauge according to claim 1, in which the means to transmit the detection of said discharged drop via a current loop to a signal processor comprises an intermediate element which receives the signal from the drop detection means and converts said detection into a current loop transmission.

9. A gauge according to claim 8, in which said intermediate element comprises a bipolar darlington pair transistor.

10. A gauge according to claim 1, in which the processing means processes the drop detection signal received and using a value of drop discharge rate it determines in conjunction with a predetermined cross sectional area of the rainwater collector the actual amount of rainwater received.

11. A gauge according to claim 1, in which the processing means processes the drop detection signal received and performs an estimation of the rainwater received but not discharged, using a value of drop discharge rate it determines, and then adds this estimation to an already computed rainfall amount.

12. A gauge according to claim 1, in which the means of performing the signal processing is a computer and that the output indicating the rainfall amount is displayed on a computer monitor.

13. A gauge according to claim 1, in which the means of performing the signal processing is a microprocessor based system and that the output indicates the rainfall amount.

14. A gauge for measuring low to heavy rainfall rates comprising: rainwater collection means with a height and cross sectional area predetermined to provide a desired resolution for rainwater collection, which channels the rainwater to a filter at a lower end thereof, a means for filtering the collected rainwater and to reduce the pressure created by any water resident within the collector by a predetermined amount, and which is directly connected to a discharge funnel apparatus which receives at an upper end thereof the rainwater from a filter at the base of the collector and transfers it to a filter means located near the bottom of said funnel, a means to vent air to the funnel that connects to the two aforementioned filters and which is arranged so that rainwater will overflow the collector before rainwater will exit through the vent, a means of receiving water entering the vent means combined with a water reservoir that receives and stores water entering the vent means, the filter means located near the base of discharge funnel providing a predetermined drop in the water pressure, a discharge orifice located at the base of the discharge funnel designed to allow the collected water to discharge in the form of droplets, a means to detect the discharge of a drop from the discharge orifice based upon the resistance of the water combined with means for substantially preventing any static electricity in the collected rainwater from affecting the detection of the discharge drop, and a means to transmit the detection of said discharged drop via a current loop to a signal processor to process the drop detection signal received so as to provide an output to an operator indicating the amount of rainwater received.

15. A gauge according to claim 14, in which the reservoir comprises a cylindrical volume residing within a housing for the collector that encloses the collector means, and which directly communicates with the discharge funnel via a vent tube forming part of the vent means.

* * * * *